(12) United States Patent
Krus

(10) Patent No.: US 8,507,067 B2
(45) Date of Patent: Aug. 13, 2013

(54) TEMPERATURE OSCILLATION DECOUPLING ELEMENT

(75) Inventor: Ralf Krus, Lindlar (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 224 days.

(21) Appl. No.: 13/255,605

(22) PCT Filed: Dec. 7, 2009

(86) PCT No.: PCT/EP2009/008725
§ 371 (c)(1),
(2), (4) Date: Sep. 9, 2011

(87) PCT Pub. No.: WO2010/102656
PCT Pub. Date: Sep. 16, 2010

(65) Prior Publication Data
US 2011/0318526 A1      Dec. 29, 2011

(30) Foreign Application Priority Data

Mar. 9, 2009   (DE) .................. 10 2009 012 383

(51) Int. Cl.
*B32B 3/10* (2006.01)

(52) U.S. Cl.
USPC .................... 428/66.6; 267/141.2; 267/141.3; 181/207; 181/208

(58) Field of Classification Search
USPC ............... 428/66.6; 267/141.2, 141.3, 141.4; 181/207, 208, 211
See application file for complete search history.

(56) References Cited

U.S. PATENT DOCUMENTS

| 2005/0040576 A1 | 2/2005 | Oxenknecht |
| 2006/0219860 A1 | 10/2006 | Greenwood |

FOREIGN PATENT DOCUMENTS

| DE | 4329411 C2 | 5/1994 |
| DE | 197 16 733 A1 | 10/1998 |
| EP | 0917507 B1 | 5/1999 |
| EP | 1 528 231 A1 | 5/2005 |
| WO | WO 2006/099913 A1 | 9/2006 |

*Primary Examiner* — Alexander Thomas
(74) *Attorney, Agent, or Firm* — Robert L. Stearns; Dickinson Wright, PLLC

(57) ABSTRACT

A shielding device is provided with a shielding element, which can be used for the thermal and acoustic shielding of components in a combustion engine. The mounting of the shielding device is such that thermal, acoustic and vibration transmission from hot, loud and vibrating components in the engine compartment or underbody area to a vehicle body is isolated.

10 Claims, 1 Drawing Sheet

TEMPERATURE OSCILLATION DECOUPLING ELEMENT

BACKGROUND OF THE INVENTION

1. Technical Field of the Invention

Figure 1:
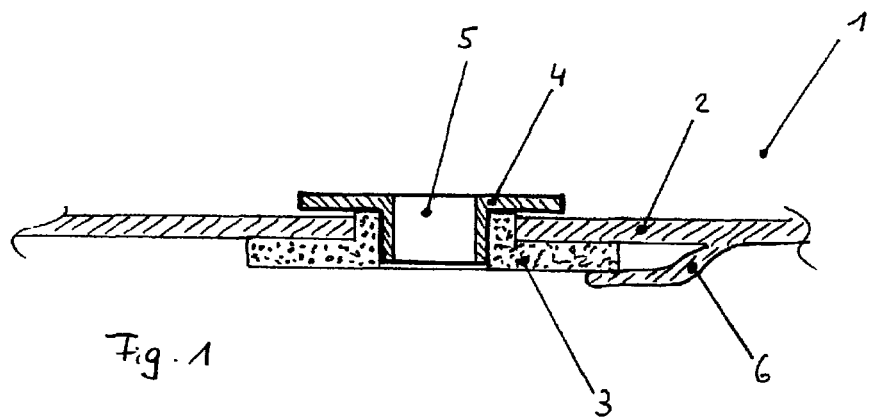

The present invention relates to a shielding device with a shielding element, which can be used for the thermal and acoustic shielding of components in a combustion engine. The present invention particularly relates to a mounting of the shielding device, in which a thermal, acoustic and vibration transmission from hot, loud and vibrating components in the engine compartment or underbody area to a vehicle body is isolated.

2. Related Art

Shielding elements have wide-ranging uses. Special applications of shielding devices are found particularly in the vehicle industry, where they are used as heat shields to protect passengers or components, for example, from heat and noise generated in the engine. Such components are primarily parts of the exhaust system, such as catalytic converters, exhaust manifolds, turbochargers and the like. The shielding elements are designed to shield the vehicle interior from high temperatures and noise resulting from vibrations. In order to satisfy the increasingly rigorous regulations on the outside noise level of vehicles, the shielding elements should absorb a high degree of noise.

For these sorts of applications, the shielding elements must be sufficiently firm and rigid to retain their shape when there are high loads and, in addition, to protect passengers from a significant proportion of the heat and vibration generated.

The use of a single metal sheet made from aluminium or an alloy, for example, is often insufficient, because although such a metal sheet is able to reduce infrared radiation and convection, its acoustic damping properties, for example, are too low.

In addition, the shielding elements mentioned in the state of the art exhibit the unfavourable property of transmitting the thermal radiation, acoustic waves and vibrations absorbed by the shielding element for example to the mounting points of the vehicle body and therefore ultimately to the vehicle body, so that passengers and heat-sensitive parts of the vehicle no longer have optimum protection.

This sort of shielding element is disclosed in EP 0 917 507 B1, for example. This discloses a method of producing a thermally insulating composite panel. However, the problem of limiting the thermal, acoustic and vibration transmission to the components surrounding the composite panel is not dealt with here.

DE 43 29 411 C2 also deals with a thermal, acoustic and vibration insulating material and a method of producing it. In this case, a thermal, acoustic and vibration damping material is disclosed, which is made up of several profiled sheets of non-ferrous metal, particularly aluminium, laid on top of one another.

The material may be used as industrial insulation and also as a heat protection shield in vehicle and rolling stock construction. The problem of adequate containment of the thermal, acoustic and vibration transmission to the components surrounding the composite panel is not solved by this either. Furthermore, an insulating effect is only achieved by the shielding elements themselves, while the mounting points of the shielding element and the component being shielded are exposed to high thermal and mechanical loads.

SUMMARY OF THE INVENTION

The problem addressed by the present invention is therefore that of providing a shielding device for components of a combustion engine and particularly of vehicles, which is easy to produce and assemble and, in addition, isolates a thermal, acoustic and vibration transmission from hot, loud and vibrating components in the engine compartment or underbody area to a vehicle body at the mounting points of the shielding element.

To solve the problem, the present invention teaches that the shielding device exhibits a shielding element with at least a first through-opening, a first side and a second side; a ring made from metal wire mesh with a centrally formed second through-opening; and a spacer ring with an L-shaped cross-section towards the centre of the spacer ring. The metal wire mesh ring also has an L-shaped cross-section towards the through-opening and is fitted in the first through-opening and the first side of the shielding element. The spacer ring is fitted in the second through-opening and the second side of the shielding element.

The structure of the shielding device according to the invention ensures that the shielding element is no longer in direct contact with the component being shielded. Direct thermal, acoustic and vibration transmission from the component into the shielding element is sharply reduced. Transmission of the thermal expansion of hot components is likewise compensated or reduced through the flexibility of the metal wire ring.

Forces on the mounting means, a screw for example, can be absorbed via the spacer ring, which prevents the metal wire ring from being completely compressed when the shielding device is mounted on the component being shielded. Varying the height of the spacer ring also enables the initial tension acting on the metal wire ring to be adjusted, so that the transmission of varying vibration frequencies can be reduced.

The above action can likewise be achieved through the suitable choice of metal wire as the ring material and also the density and/or thickness of the wire mesh.

Those elements known in the state of the art that guarantee suitable acoustic, mechanical and/or thermal shielding can be used as the shielding element. The shielding element preferably has two, three, four, five or more first through-openings, in which a metal wire mesh ring with a centrally disposed second through-opening is fitted in the first through-opening and the first side of the shielding element in each case. Furthermore, a spacer ring is fitted in the second through-opening and the second side of the shielding element. Further mounting points can therefore be defined on the shielding element.

A layer of stainless steel (e.g. material numbers 1.4512 or 1.4509) or aluminium, for example, with a thickness of 0.15 to 0.30 mm, preferably from 0.20 to 0.25 mm, can be used for thermal shielding. However, combinations of different material layers may also be used as the shielding element.

The metal wire mesh ring and the spacer ring may likewise be made from stainless steel (e.g. material numbers 1.4512 or 1.4509).

In accordance with a preferred embodiment, the spacer ring is designed as a mounting element on an object being shielded. Where the shielding device is mounted on a component to be shielded, the first side of the shielding element represents the side facing away from the component, whereas the second side of the shielding element faces the component. The mounting may be made directly via the spacer ring, for example by means of a plug connection disposed on it, which allows a connection to the component being shielded.

In accordance with a further embodiment, the spacer ring has a centrally formed third through-opening, which facilitates screwing-fastening or rivet-mounting to the component being shielded, for example. Mounting is preferably carried out by means of screws, because the initial tension acting on the metal wire ring can thereby be easily adjusted, allowing a simple adjustment of the vibration frequencies to be suppressed. For example, a mechanic may reduce or completely eliminate particularly disturbing vibration frequencies through suitable adjustment of the mounting element with the help of a traditional acoustic measuring device.

In accordance with another embodiment, the mounting means following adjustment of a desired initial tension on the shielding device is secured to the spacer ring, for example, in such a way that a loosening of the mounting means by vibrations, for example, can be avoided.

In accordance with another embodiment, the shielding element exhibits at least one mounting element for attachment to the metal wire mesh ring, in the form of a stud with a matching nut, for example. The at least one mounting element preferably takes the form of a punched hole in the material on a reference diameter of the second side of the shielding element. The reference diameter in this case is greater than the diameter of the metal wire mesh ring. The use of a lug-like material punched hole enables the metal wire ring to be secured to the shielding element following its bending.

In accordance with a further embodiment, there are at least three mounting elements.

In accordance with a preferred embodiment, the metal of the metal wire mesh exhibits low thermal conductivity and high elasticity. Stainless steel (e.g. material numbers 1.4512 or 1.4509) is a suitable material for installation in vehicles, in order to provide suitable shielding for components such as catalytic converters, exhaust manifolds, turbochargers and the like.

In accordance with a further embodiment, the first through-opening has a diameter of 0.25-1 cm, preferably 0.4-0.6 cm, more preferably of 0.4-0.5 cm.

In accordance with an embodiment, the second through-opening has a smaller diameter than that of the first through-opening. Preferable diameters of the second through-opening are 0.15-0.9 cm, preferably 0.3-0.5 cm, more preferably 0.3-0.4 cm.

In accordance with a further embodiment, the third through-opening exhibits a smaller diameter than that of the second through-opening. Preferred diameters of the second through-opening are 0.1-0.8 cm, preferably 0.2-0.6 cm, more preferably 0.25-0.35 cm.

THE DRAWINGS

Figure 2:
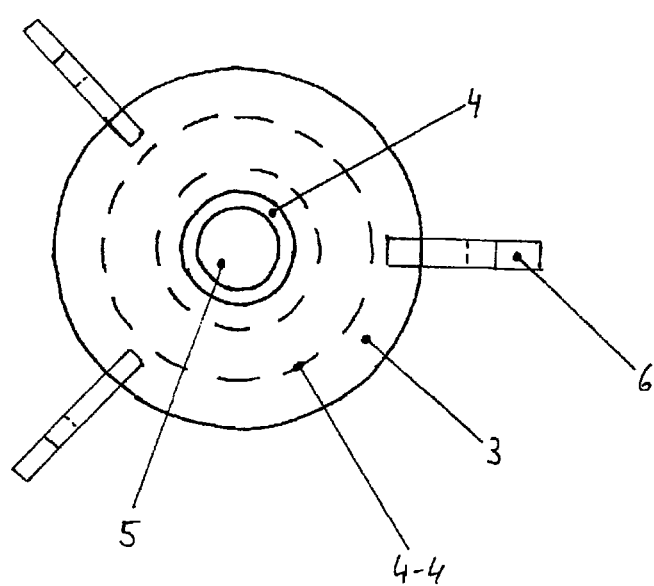

The present invention is explained in greater detail below with reference to the enclosed drawings, wherein FIG. 1 shows an embodiment of the present invention in cross-section; and FIG. 2 shows a top view of the first side of the shielding element of the embodiment shown in FIG. 1.

In FIG. 1 an embodiment of the shielding device 1 according to the invention is shown in a cross-sectional view, which is disposed to shield a component of a combustion engine (now shown). The component may be, for example, a turbocharger, a catalytic converter or another component, which becomes hot during operation and therefore represents a heat source. Thermal emission is often also associated with acoustic emission, as is the case with sound dampers or turbochargers, for example.

DETAILED DESCRIPTION

The shielding element 2 used has a shielding effect in relation to thermal and acoustic emission. A different type of shield is generally required than for sound. While in this case of thermal emission it is desirable for this to be reflected to the greatest possible degree, i.e. emitted into the environment, exactly the opposite effect is required in the case of sound. Acoustic waves should not be reflected, which increases the vehicle's external noise and can also lead to resonances in unfavourable cases, but instead, absorbed as fully as possible.

In the embodiment shown in FIG. 1, the shielding element 2 exhibits a first through-opening in which the metal wire ring 3 is fitted so that the collar of the L-shaped cross-section terminates with the second side of the shielding element or else via a crosspiece. The shielding element 2 exhibits a mounting element in the form of a lug-like material through-hole 6, which is provided to fix the metal wire ring 3 to the shielding element 2. By turning over the material through-hole 6, the metal wire ring 3 is secured to the shielding element 2. A spacer ring 4 is disposed in the second through-hole disposed in the centre of the metal wire ring 3. The collar of the spacer ring should preferably terminate not with the surface of the metal wire ring facing/adjacent to the component, so that a thermal, vibration and acoustic transmission from the component can thereby be reduced or eliminated by the spacer ring material. The spacer ring 4 exhibits a centrally disposed through-opening 5, through which a mounting element can be inserted to fix the shielding device 1 to the component.

FIG. 2 shows a top view of the first side of the shielding element 2. The outer edge of the spacer ring 4 is shown by the dotted line 4-4. The metal wire ring 3 represents the contact surface with the component and is secured to a shielding element with three mounting elements. In the metal wire ring 3, (mechanical) acoustic waves are on the one hand converted into heat by friction; on the other hand, (electromagnetic) thermal radiation is only conducted to a small extent to the shielding element 2 by the metal wire ring 3.

The metal wire mesh of the metal wire ring 3 may be in the form of both a regular and irregular mesh, i.e. the size and configuration of the through-openings or also "pores" is either regular or irregular. "Porosity" in this case should be understood to mean the total surface of the through-openings relative to the total surface of the mesh layer. Thanks to its porosity (20 to 30%), the mesh is capable of converting emerging acoustic waves into heat by friction and thereby damping them.

In this case, the regular or irregular intervals or the size of the pores in the mesh are designed according to the frequency range of the acoustic waves being shielded. An additional possibility for influencing the porosity (adjustment to different frequencies) of the mesh may be flat-rolling or compressing to different mesh thicknesses, whereby the porosity can be changed. In this way, additional stiffness of the mesh can also be achieved.

In order to guarantee the mesh's corrosion resistance, it is advantageous for the mesh to be additionally coated with zinc or aluminium. Stainless steel meshes require no such coating.

Heat reflection can also be increased through additional coating of the mesh and the thermal shielding effect thereby improved.

The spacer ring is preferably coated.

The invention claimed is:
1. A shielding device, comprising:
a shielding element with at least a first through-opening, a first side and a second side;
a ring made from metal wire mesh with a centrally formed second through-opening; wherein the ring made from metal wire mesh has an L-shaped cross-section towards the through-opening; and a spacer ring, which has an L-shaped cross-section towards the center of the spacer ring;

wherein the wire metal mesh ring is fitted in the first through-opening and the first side of the shielding element;

the spacer ring is fitted in the second through-opening and the second side of the shielding element;

the shielding element exhibits at least one mounting element for attachment to the metal wire mesh ring; and the at least one mounting element takes the form of a punched hole in the material on a reference diameter of the second side of the shielding element, wherein the reference diameter is greater than the diameter of the metal wire mesh ring.

2. The shielding device according to claim 1, wherein the spacer ring is designed as a mounting element on an object being shielded.

3. The shielding device according to claim 2, wherein the spacer ring has a centrally formed third through-opening, which is designed to receive mounting means.

4. The shielding device according to claim 3, wherein the mounting means is a screw.

5. The shielding device according to claim 3, wherein the mounting means is secured to the spacer ring.

6. The shielding device according to claim 3, wherein 3 or more mounting elements exist.

7. The shielding device according to claim 3, wherein the third through-opening has a diameter of 0.15-0.9 cm.

8. The shielding device according to claim 1, wherein the material of the metal wire ring exhibits low thermal conductivity and high elasticity.

9. The shielding device according to claim 1, wherein the first through-opening has a diameter of 0.25-1 cm.

10. The shielding device according to claim 1, wherein the second through-opening has a diameter of 0.15-0.9 cm.

* * * * *